US010754569B2

(12) United States Patent
Jeyaram et al.

(10) Patent No.: US 10,754,569 B2
(45) Date of Patent: Aug. 25, 2020

(54) METHODS TO REDUCE STORAGE CAPACITY

(71) Applicant: Oracle International Corporation, Redwood Shores, CA (US)

(72) Inventors: Prabahar Jeyaram, Dublin, CA (US); Yimin Ding, Mountain View, CA (US); Victor Latushkin, Boulder, CO (US); John William Poduska, Jr., Winchester, MA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/123,832

(22) Filed: Sep. 6, 2018

(65) Prior Publication Data
US 2020/0081644 A1 Mar. 12, 2020

(51) Int. Cl.
*G06F 3/06* (2006.01)
*G06F 11/34* (2006.01)

(52) U.S. Cl.
CPC ............ *G06F 3/0644* (2013.01); *G06F 3/064* (2013.01); *G06F 3/065* (2013.01); *G06F 3/0607* (2013.01); *G06F 3/0664* (2013.01); *G06F 3/0689* (2013.01); *G06F 11/3442* (2013.01)

(58) Field of Classification Search
CPC ........ G06F 3/064; G06F 3/065; G06F 3/0607; G06F 3/0644; G06F 11/3442; G06F 3/0689; G06F 3/0664
USPC .......................................................... 711/114
See application file for complete search history.

(56) References Cited

U.S. PATENT DOCUMENTS

| | | | |
|---|---|---|---|
| 6,968,350 | B2 | 11/2005 | Traut et al. |
| 7,555,596 | B2 | 6/2009 | Tolba |
| 8,312,212 | B2 | 11/2012 | Tolba |
| 8,429,125 | B2 | 4/2013 | Mohl et al. |
| 9,304,912 | B1 | 4/2016 | Zhang |
| 9,792,075 | B1 | 10/2017 | Banerjee et al. |
| 9,851,991 | B2 | 12/2017 | Russinovich et al. |
| 10,002,001 | B1 | 6/2018 | Hendrie et al. |

(Continued)

FOREIGN PATENT DOCUMENTS

WO      02082262      10/2002

OTHER PUBLICATIONS

K. Qian, L. Yi and J. Shu, "ThinStore: Out-of-Band Virtualization with Thin Provisioning," 2011 IEEE Sixth International Conference on Networking, Architecture, and Storage, Dalian, Liaoning, 2011, pp. 1-10.*

(Continued)

*Primary Examiner* — Pierre Miche Bataille
(74) *Attorney, Agent, or Firm* — Kilpatrick Townsend & Stockton LLP

(57) ABSTRACT

A virtual storage device may be generated that replicates a layout of a physical storage device it is replacing. The virtual storage device may be used to store data formerly stored in the physical storage device. The layout may detail various configurations of the physical storage device such as if the physical storage derive implements fixed or variable-block sizes and/or if it implements a level of redundant array of independent disks (RAID). By replicating the layout of a physical storage device that it may replace, the virtual storage device described within various embodiments may offer advantages over other virtual storage devices.

20 Claims, 7 Drawing Sheets

(56) References Cited

U.S. PATENT DOCUMENTS

| | | |
|---|---|---|
| 10,212,055 B2 * | 2/2019 | Hart .................... H04L 41/0681 |
| 10,289,545 B2 * | 5/2019 | Talagala .............. G06F 12/0246 |
| 2002/0147862 A1 | 10/2002 | Traut et al. |
| 2006/0155667 A1 | 7/2006 | Tolba |
| 2008/0320127 A1 | 12/2008 | Fries |
| 2009/0235358 A1 | 9/2009 | Tolba |
| 2012/0084506 A1 * | 4/2012 | Colgrove ............ G06F 11/1076 711/114 |
| 2012/0216189 A1 | 8/2012 | Kalbarga et al. |
| 2012/0239860 A1 * | 9/2012 | Atkisson ............. G06F 12/0246 711/103 |
| 2013/0080387 A1 | 3/2013 | Mohl et al. |
| 2013/0339407 A1 * | 12/2013 | Sharpe .................. G06F 3/0611 707/827 |
| 2014/0019972 A1 * | 1/2014 | Yahalom ............. H04L 67/1097 718/1 |
| 2014/0195567 A1 * | 7/2014 | Julien .................... G06F 16/21 707/812 |
| 2014/0237159 A9 * | 8/2014 | Flynn ................... G06F 12/0246 711/102 |
| 2014/0281692 A1 * | 9/2014 | Paleologu ........... G06F 11/2056 714/6.32 |
| 2015/0058547 A1 * | 2/2015 | Thatcher ............... G06F 3/0604 711/103 |
| 2015/0227602 A1 * | 8/2015 | Ramu .................... G06F 16/27 707/634 |
| 2017/0102952 A1 | 4/2017 | Khemani et al. |
| 2017/0364413 A1 * | 12/2017 | Ben-Or ............... G06F 11/2038 |

OTHER PUBLICATIONS

B. Mao, H. Jiang, S. Wu and L. Tian, "Leveraging Data Deduplication to Improve the Performance of Primary Storage Systems in the Cloud," in IEEE Transactions on Computers, vol. 65, No. 6, pp. 1775-1788, Jun. 1, 2016.*

* cited by examiner

METHODS TO REDUCE STORAGE CAPACITY

BACKGROUND

Storage systems are the backbone of many Internet-based and cloud-based applications. Storage systems may store various datasets related to various applications and processes. Storage systems may include a plurality of storage devices, and these storage devices may be fallible. Whenever these storage devices fail, it may potentially compromise the storage system as a whole and thus any application or process that relies upon the storage system. Furthermore, storage capacity associated with a storage system may, in some instances, need to be reduced or repurposed. Embodiments described within this disclosure improve the performance of storage systems.

BRIEF SUMMARY

The present disclosure relates generally to storage systems. More particularly, techniques are described for replacing a physical storage device of a set of physical storage devices with a virtual storage device. More specifically, a virtual device can be defined to include a set of storage blocks (e.g., of variable-block size) distributed across two or more other of the set of physical storage devices. Various inventive embodiments are described herein, including methods, systems, non-transitory computer-readable storage media storing programs, code, or instructions executable by one or more processors, and the like.

In certain embodiments, a storage system may contain one or more storage pools. Each storage pool of the one or more storage pools may contain a plurality of physical storage devices. These physical storage devices may be used to store several different types of data, including, but not limited to, database objects, audio files, video files, documents, spreadsheets, data files, log files in the like. In some instances, a physical storage device may fail, be tagged for reallocation, or be flagged for removal from a storage pool. However, it may be desirable to preserve the data stored on the particular physical device in an efficient and seamless manner (e.g. that does not entail shutting down the storage system).

In one or more embodiments, a virtual storage device may be generated that replicates a layout of a physical storage device it is replacing. The virtual storage device may be used to store data formerly stored in the physical storage device. The layout may detail various configurations of the physical storage device, such as if it implements fixed or variable-block sizes and/or if it implements a level of redundant array of independent disks (RAID). By replicating the layout of a physical storage device that it may replace, the virtual storage device, described within various embodiments, may offer advantages over other virtual storage devices. For example, one alternative approach is to generate and configure a virtual storage device in a manner that is agnostic of one or more physical storage devices in the same storage pool. In such an example, in prior systems, physical storage devices in a storage pool may all implement variable data-block sizes, but a virtual storage device may be generated that implements fixed-data block sizes. Creating such an agnostic virtual storage device may lead to an increase in metadata used for storing data. For example, going from a variable-block size to a fixed-block sizes may require additional block pointers. As a result, creating an agnostic virtual storage device may lead to an inefficient use of memory allocated to the virtual storage device. In contrast, generating a virtual storage device, as described in one or more embodiments of the disclosure, may reduce the amount of metadata typically stored by a virtual storage device, which may allow more data storage within the virtual storage device.

Generating a virtual storage device, as described in one or more embodiments of the disclosure, may also allow the virtual storage device to be used as a "hot spare." A virtual storage device may be generated dynamically when needed, which allows the virtual storage device to quickly replace a failed hard drive. In this sense, the virtual storage device is a spare to the failed hard drive. By using a virtual storage device as a hot spare, a storage system may continue to operate without shutting down to replace the failed hard drive. The virtual storage device may be generated and implemented without shutting down the storage system or storage pool that hosts the virtual storage device.

Furthermore, generating a virtual storage device may allow a hard drive to be reallocated to a different storage pool. A virtual storage device may replicate the layout of a hard drive and appear, to an operating system, that it is the hard drive it is replacing. If the virtual storage device appears as the drive it is replacing, it allows the operating system to reference the virtual storage device by the same means it referenced the hard drive, which does not interrupt the operation of the operating system. Thus, allowing the actual hard disk to be removed seamlessly from the storage pool without an interruption to the operating system. In addition, the hard disk may be reallocated to a different storage pool without interrupting the operating system. The removal and reallocation of the hard drive may reduce the memory capacity of the storage pool and increase the memory of a different storage pool, all while not requiring the storage system to shut down. Several other advantages of the techniques described within this disclosure may be realized by one skilled in the art.

The foregoing, together with other features and embodiments will become more apparent upon referring to the following specification, claims, and accompanying drawings.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Figure 1:
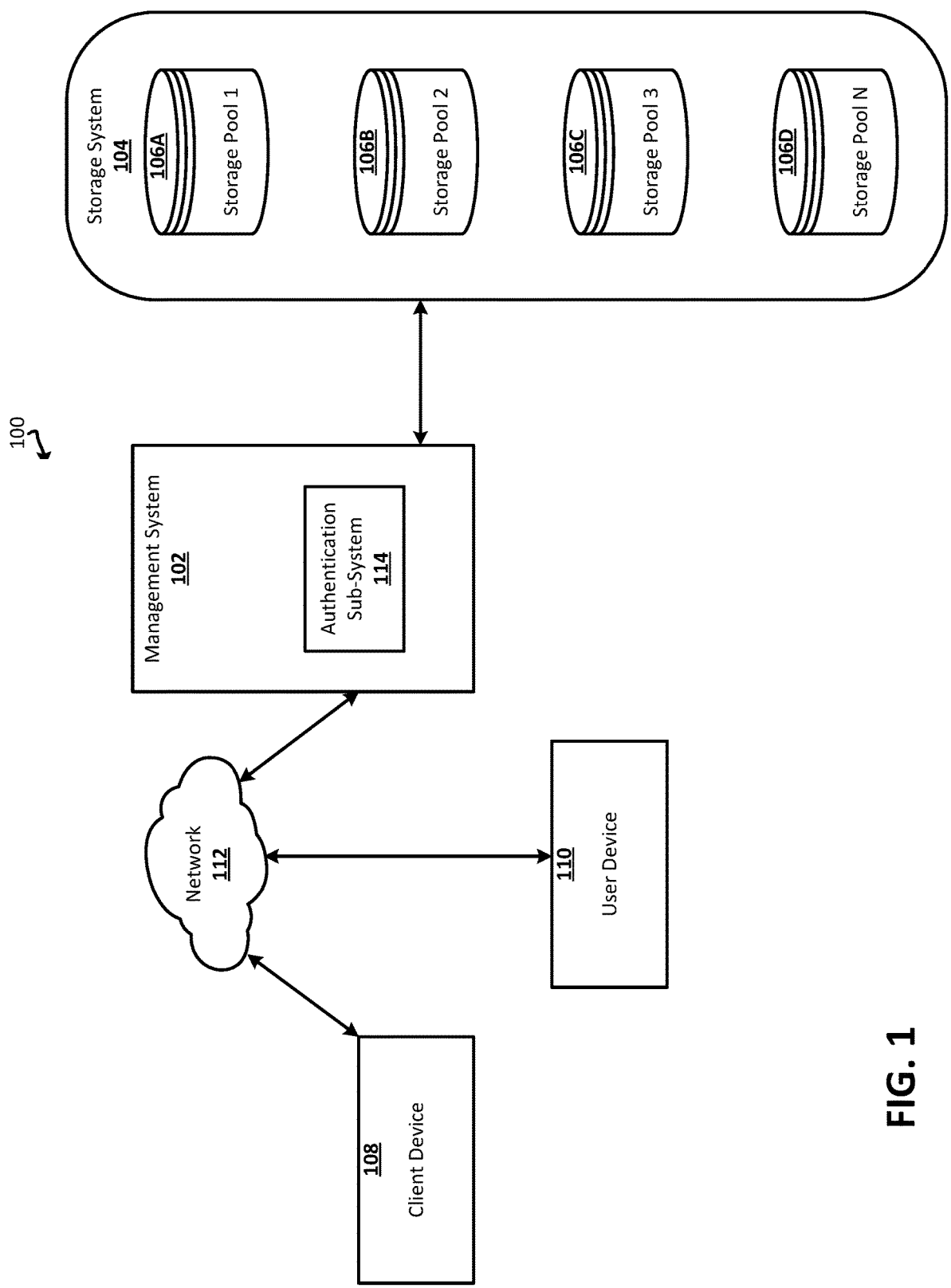
FIG. 1 is a simplified block diagram of a distributed environment in accordance with one or more embodiments.

FIG. 1 is a simplified block diagram of an exemplary distributed environment 100. Distributed environment 100 may comprise multiple systems communicatively coupled to each other via one or more communication networks 112. The systems in FIG. 1 include one or more management systems 102, one or more storage systems 104, one or more client devices 108, and one or more user devices 110. Management system 102, user device 110, and client device 108 may be communicatively coupled to each other via communication network 112.

Management system 102 may be a computerized system connected to and configured to manage storage system 104. Management system 102 may control inputs and outputs to storage system 104, and thus, may control how data is stored in storage system 104 and how data is retrieved from storage system 104. In one embodiment, management system 102 may implement one or more file systems, such as File Allocation Table (FAT), exFAT, New Technology File System (NTFS), Hierarchical File system (HFS), Apple File System (APFS), ZFS, Universal Disk Format (UDF), and the like. In one embodiment, management system 102 may implement both a file system and a logical volume manager. A logical volume manager may produce logical volumes across one or more physical storage devices. A logical volume may be detected by an operating system of a computing device (i.e. operating system of user device 110) as a single storage partition, even if the logical volume spans across multiple physical storage devices. In one embodiment, a virtual storage device may be implemented by a logical volume. In one embodiment, a logical volume may be generated by allocating a plurality of available data storage locations of a plurality of physical storage devices. This group of available data storage locations of physical storage devices may be referenced collectively as a single logical volume. In one embodiment, management system 102 may receive data to store in storage system 104 from client device 108. In one embodiment, management system 102 may receive a request to access data in storage system 104 from user device 110 and/or client device 108.

Management system 102 may comprise one or more processors and non-volatile memory resources. The processor(s) may include single or multicore processors. The processor(s) may include general purpose microprocessors such as ones provided by Intel®, AMD®, ARM®, Freescale Semiconductor, Inc., and the like, that operate under the control of software stored in associated memory. An application executed by management system 102 may be executed by the processor(s). In one embodiment, management system 102 may be implemented as a storage controller for one or more storage pools within storage system 104.

Management system 102 may comprise authentication sub-system 114. Authentication sub-system 114 may process requests to store data in storage system 104 from client device 108 to determine if the request is authenticated and/or authorized. In one embodiment, a request to store data may include authentication information such as a user identifier, hardware identifier, a password, biometric information, credentials, and the like. Authentication sub-system 114 may compare the received authentication information to stored authentication information associated with client device 108 to authenticate client device 108 or a user of client device 108. In one embodiment, authentication sub-system 114 may compare received hardware identifier or user identifier associated with client device 108 to a white-list of authorized devices or users that may add data to storage system 104 to determine if client device 108 is authorized to store data within storage system 104. In circumstances when client device 108 or a user of client device 108 is authenticated, client device 108 may transmit, to management system 102, data to be stored within storage system 104. In circumstances when client device 108 or a user of client device 108 is not authenticated, an error message may be transmitted to client device 108 indicating an unsuccessful authentication attempt.

Authentication sub-system 114 may (additionally or alternatively) process requests to retrieve data from storage system 104 from user device 110. The request to retrieve data from storage system 104 may include authentication information such as a user identifier, hardware identifier, a password, biometric information, credentials, and the like. Authentication sub-system 114 may compare the received authentication information to stored authentication associated with user device 110 to authenticate user device 110 or a user of user device 110. Authentication sub-system 114 may compare a received user identifier or hardware identifier associated with user device 110 to a white-list of authorized user devices or users that may retrieve particular data from storage system 104 to determine if user device 110 is authorized to retrieve particular data from storage system 104. In circumstances when user device 110 or a user of user device 110 is authenticated and authorized to retrieve particular data, management system 102 may transmit, to user device, the particular data from storage system 104. In circumstances when user device 110 or a user of user device 110 is not authenticated or authorized to retrieve particular data, an error message may be transmitted to user device 110 indicating an unsuccessful authentication attempt and/or unsuccessful authorization to the particular data.

Storage system 104 may be implemented as a database, one or more servers (e.g., a server farm), and the like. Storage system 104 may comprise storage pools 106A-106D. Each storage pool may comprise a plurality of storage devices. For example, a storage device may be a physical storage device, such as, a hard disk drive (HDD), solid state drive (SSD), and the like. In addition, a storage pool may comprise one or more virtual storage devices. A virtual storage device may include a virtualized storage medium. In one embodiment, a virtual storage device may pool together one or more parts of other physical storage devices to form a logical volume. This logical volume may appear to an operating system of a device as a single physical storage device. A virtual storage device may be used as a physical storage device.

A storage pool may be a collection of storage devices that may have the same layout (e.g., mirroring, redundant array of independent disks (RAID) 0, RAID 1, RAID 2, RAID 3, RAID 4, RAID 5, RAID 6, nested RAID, and/or block layout). In one embodiment, a storage device may have a variable-block data layout. In a variable-block data layout, a storage device may store data blocks with variable sizes, such that each data block size is at least equal to a sector size of the storage device and less than a maximum limit (e.g. 4 KB, 500 KB, 1 MB, 2 MB, 3 MB, and the like) determined by management system 102. The maximum limit determined by management system 102 may be based upon a file system implemented by management system 102. The sector size may be a physical attribute of the storage device. For example, a sector size of a SSD may be 4 kilobytes (KB) and management system 102 may implement a ZFS file system which may have a maximum block size of 1 megabyte (MB). In such an example, a data block may be between 4 KB (i.e. the sector size) and 1 MB. For example, a 16 KB file may be stored in a single data block with storage system 104.

In one embodiment, a storage device may have a fixed-block data layout. In a fixed-block data layout, a storage device may store data blocks with a fixed size. The fixed size may be determined by the sector size of the storage device and/or by a file system implemented by management system 102. For example, a sector size of a SSD may be 4 KB and thus each block may be fixed to the size of 4 KB. In such an example, a 16 KB file may be stored in four data blocks within storage system 104. In one embodiment, each storage pool within storage system 104 may have a separate manager system 102 to manage each storage pool. Each storage pool may implement SSD storage, HDD storage, or a combination of SSD/HDD storage.

In one embodiment, each storage device in a storage pool may implement a level of RAID to protect data in the storage pool. For example, a storage pool may implement RAID 1 (disk mirroring). In RAID 1, data on a first storage device is copied to a second storage device. This process of mirroring provides data redundancy in the storage pool. If the first storage device fails, data may be accessed from the second storage device. Then the first storage device may be replaced with a third storage device and data may be copied from the second storage device to the third storage device. Any level of RAID may be used by a storage pool in order to protect data in the storage pool.

Client device 108 and user device 110 may include various types of computing systems, such as portable handheld devices, general-purpose computers (e.g., personal computers and laptops), workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Client device 108 may be operated by a client. For example, a client may be a management organization. In such an embodiment, the management organization associated with client device 108 may be a cloud-based service provider that manages storage system 104. User device 110 may be operated by a user of an access organization. An access organization may be an organization that retrieves data from storage system 104. For example, a cloud-based service provider (e.g., management organization) may provide to members of an access organization one or more cloud-based storage services. In such an example, user device 110, which is associated with the access organization, may run one or more applications to access storage system 104 and storage system 104 may be provided by the management organization.

Communication network 112 facilitates communication between the various systems depicted in FIG. 1. Communication network 112 can be of various types and can include one or more communication networks. Examples of communication network 112 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 112 may include any infrastructure that facilitates communications between the various systems depicted in FIG. 1.

Figure 2:
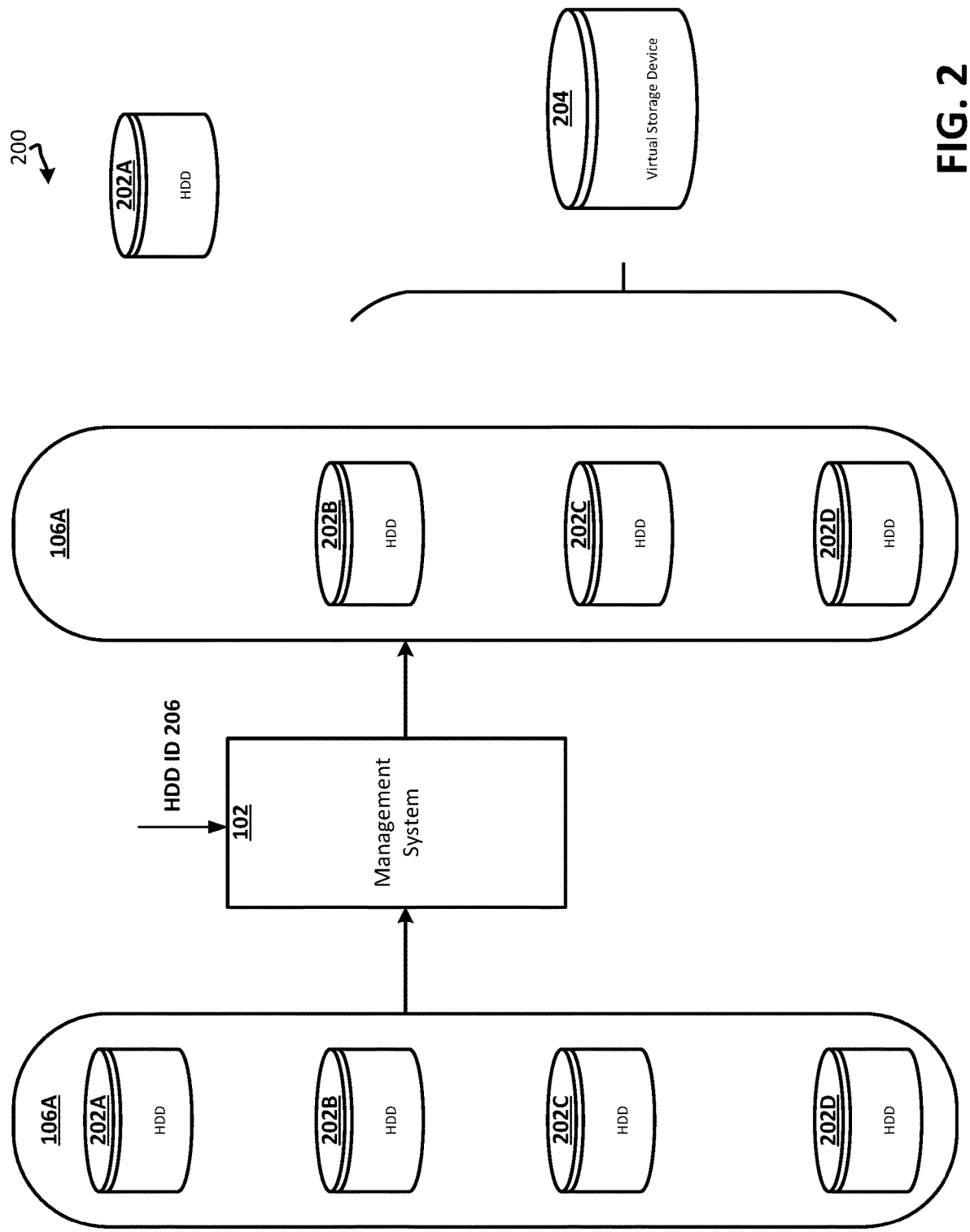
FIG. 2 depicts a simplified block diagram of a second distributed environment in accordance with one or more embodiments.

FIG. 2 is a simplified block diagram of a distributed environment 200 in accordance with one or more embodiments. Distributed environment 200 depicts a virtual storage device 204 replacing a hard drive disk (HDD) 202A within storage pool 106A. Distributed environment 200 comprises storage pool 106A, management system 102, and virtual storage device 204.

Storage pool 106A comprises HDDs 202A-202D. HDDs 202A-202D are depicted as HDDs, but may be other type of storage devices, such as a SSD. HDDs 202A-202D may each be characterized as having a storage capacity that identifies a quantity of data that may be stored by the HDD. For example, storage capacity may be 10 gigabytes (GB), 100 GB, 1 terabyte (TB), 100 TB, and the like. In one embodiment, HDDs 202A-202D may each have a unique storage capacity. In one embodiment, HDDs 202A-202D may all have the same storage capacity.

HDDs 202A-202D may each be characterized as having a sector size. A sector size may identify a minimum block size capable of being stored by the HDD. For example, a sector size may be 512 bytes, 4 KB, and the like. In one embodiment, HDDs 202A-202D may each have a unique sector size. In one embodiment, HDDs 202A-202D may all have the same sector size. HDDs 202A-202D may each be characterized as having a remaining storage capacity that corresponds to a quantity of unoccupied storage space in a HDD. For example, remaining storage capacity may be a percentage of a storage capacity (e.g. 45% remaining storage capacity). In another example, remaining storage capacity may be a measure of storage (e.g. 45 GB remaining storage capacity).

Storage pool 106A may have a pool storage capacity. A pool storage capacity may define a quantity of data that may be stored by storage pool 106A. A pool storage capacity may be determined based upon a storage capacity of each HDDs 202A-202D. For example, a pool storage capacity may be the sum of the storage capacities of HDDs 202A-202D. For example, each of HDDs 202A-202D may have an individual storage capacity of 1 TB. As a result, a pool storage capacity may be 4 TB. Storage pool 106A may have a remaining pool storage capacity that may define a quantity of unoccupied storage space in storage pool 106A. For example, a remaining pool storage capacity may be a percentage of a pool storage capacity (e.g. 55% remaining pool storage capacity). In another example, remaining pool storage capacity may be a measure of storage (e.g. 55 GB remaining storage capacity). The remaining pool storage capacity may also indicate which HDDs correspond to the remaining pool storage capacity, for example, 55% remaining storage capacity in HDD 202A, 0% in HDD 202B, and the like.

Various triggering events that occur that indicate that HDD 202A may be replaced by virtual storage device 204. A first triggering event may be a failure of HDD 202A. A failure of HDD 202A may be indicated by unresponsiveness of HDD 202A to a challenge. For example, management system 102 may query HDD 202A for one or more datasets but not receive a response. Such unresponsiveness may indicate to management system 102 that HDD 202A has failed. In one embodiment, user device 110 may attempt to access one or more datasets in HDD 202A and receive an error. User device 110 may then transmit the error along with HDD identifier 206 to management system 102. Management system 102 may then determine, based on the received error, that HDD 202A has failed. A second triggering event may be a degradation of performance of HDD 202A. HDD 202A may have certain performance thresholds, and if one or more performance thresholds are breached it may indicate a degradation of performance. For example, HDD 202A may have a performance threshold of a minimum data transfer rate of 5000 MB/second. In such an example, when the data transfer rate of HDD 202A drops below this threshold it may indicate a degradation of performance. In one embodiment, a performance threshold may be related to a HDD's rotational speed. A third trigger event may be a time counter associated with a last defragmentation of HDD 202A. The time counter may indicate the last time HDD 202A was defragmented. Over time, data may be written to and over written on HDD 202A. During this writing and over writing process, data may become fragmented within HDD 202A. Fragmented data may slow down the speed of HDD 202A. However, defragmenting is the process of arranging data within HDD 202A so that the data is contiguous (as opposed to fragmented.) It may be beneficial to defragment HDD 202A every so often to ensure that HDD 202A is optimal working condition. For example, HDD 202A may have an associated time counter that indicates HDD 202A was last defragmented 365 days ago. Storage system 104 may require each HDD to be defragmented after 360 days. In such an instance, a trigger event may be indicated.

When one or more trigger events occur, management system 102, may receive an HDD identifier 206. HDD identifier 206 may be an identifier identifying HDD 202A. Management system 102 may also receive an indication of a trigger event. For example, management system 102 may receive HDD identifier 206 and an indication that HDD 202A has a degradation in performance. The indication may further include a numeric value associated with the degradation in performance, such as, 5000 MB/second, to indicate the data transfer speed of HDD 202A has fallen below the threshold of 5000 MB/second.

Once HDD 202A has been identified via HDD identifier 206, management system 102 may create virtual storage device 204 across HDDs 202B-202D. Management system 102 may create virtual storage device 204 by forming a logical volume across one or more parts of HDDs 202B-202D. In one embodiment, management system 102 may identify a remaining storage capacity of each of HDDs 202B-202D and may also identify storage locations associated the remaining storage capacities. A storage location may be a physical area within a HDD where data may be stored. A storage location may be a sector and/or a track of a HDD. Once the storage locations associated with remaining capacity of HDDs 202B-202D are identified, management system 102 may begin to copy data from HDD 202A to virtual storage device 204. Data copied to virtual storage device 204 will physically be stored in one or more storage locations within HDDs 202B-202D. In one embodiment, virtual storage device 204 is created across each of HDDs 202B-202D. In one embodiment, virtual storage device 204 is created across two or more HDDs 202B-202D.

In one embodiment, redundancy data associated with HDD 202A may be utilized to populate data within virtual storage device 204. For example, RAID 3 (and other levels of RAID) uses parity for data redundancy. Parity allows reproduction of data from a failed device using an exclusive (XOR) function. For example, storage pool 106A may implement RAID 3. In such an example, management system 102, may XOR all of the data in HDDs 202A-202D and store the result in a parity HDD (not shown). When HDD 202A fails or is unresponsive, the data for HDD 202A may be recovered by XORing the data in the parity HDD with the data in HDDs 202B-202D to recreate data that was in HDD 202A. This recreated data may then be stored to virtual storage device 204.

After the data from HDD 202A has been copied to virtual storage device 204, HDD 202A may be removed from storage pool 106A. In one embodiment, HDD 202A may be physically removed from storage pool 106A. In such an embodiment, a person or machine associated with management system 102 may physically remove HDD 202A from storage pool 106A. In one embodiment, HDD 202A may be virtually removed from storage pool 106A. In such an embodiment, management system 102 may modify a list of device identifiers associated with storage pool 106A to remove HDD identifier 206 from the list of devices. In one embodiment, when HDD 202A is removed (either virtually or physically) it may be placed into a different storage pool. For example, management system 102 may modify HDD identifier 206 to be associated with storage pool 106B instead of storage pool 106A. In such an example, HDD 202A and its storage capacity would be reallocated to a different storage pool. The different storage pool may have a different layout.

Figure 3:
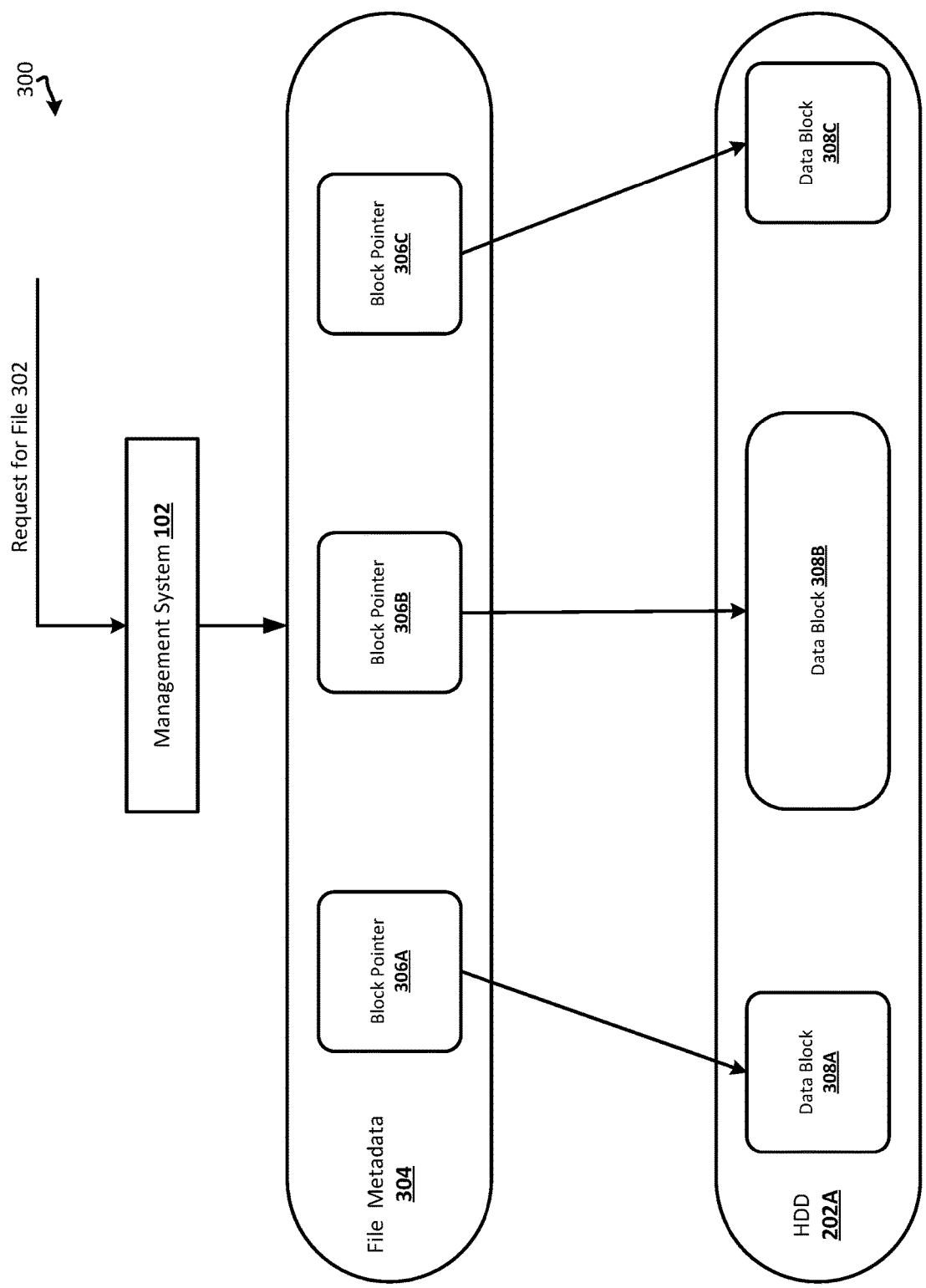
FIG. 3 depicts a simplified diagram of a variable-block environment in accordance with one or more embodiments.

FIG. 3 depicts a variable-block environment 300 that may be associated with a physical storage device or a virtual storage device. In one embodiment, whenever data is stored to a storage device, metadata may be generated and associated with the data. The metadata may comprise, among other things, block pointers. Block pointers may point to one or more storage locations where data blocks are stored. Each file stored in a storage device may include multiple data blocks. Storage devices may be formatted in a variable-block layout or a fixed-block layout. In the variable-block layout, data is stored in blocks of variable size. In variable-block environment 300, management system 102 receives a request for a file 302. File 302 may be of any file type that is suitable for storage within one or more physical or virtual storage devices. For example, file 302 may be an image file, a video file, audio file, database object, and the like. Once management system 102 receives the request for file 302, management system 102 may retrieve file metadata 304. File metadata may include several block pointers. By retrieving file metadata 304, management system 102 may locate, via block pointers, the data blocks that make up file 302.

File metadata 304 comprises block pointers 306A-306C. Block pointer 306A may point to data block 308A, block pointer 306B may point to data block 308B, block pointer 306C may point to data block 308C. Each data block may be stored within one or more sectors of HDD 202A or another physical storage device. Data blocks 308A-308C make up file 302. Data blocks 308A-308C are variable-data blocks. For example, data block 308A may be a 4 KB data block, data block 308B may be a 16 KB data block and data block 308C may be a 6 KB data block. Each data block may require a block pointer in order for management system 102 to locate the data block. By discretizing data into variable block sizes it may optimize the number block pointers to be used to locate data.

Figure 4:
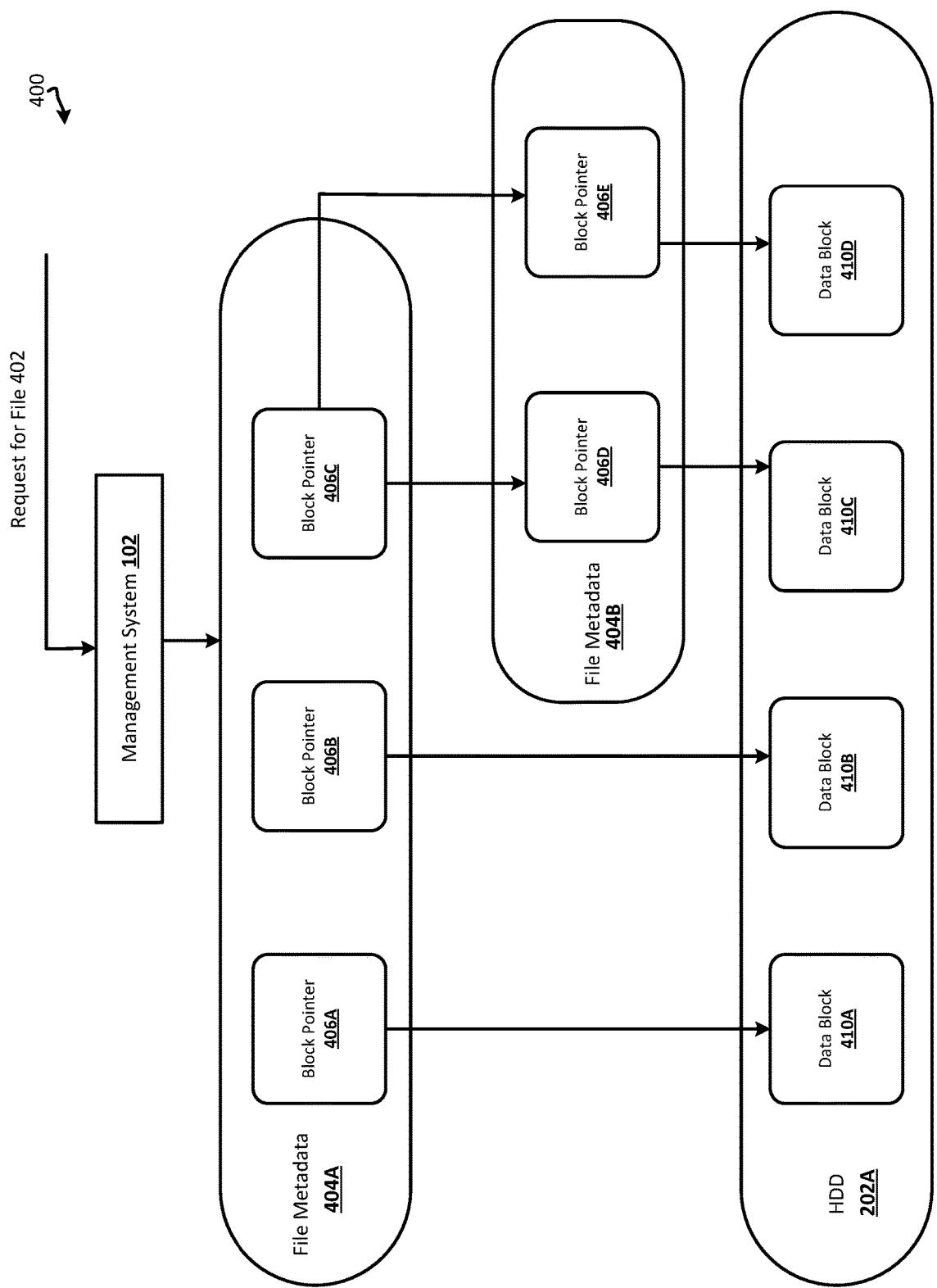
FIG. 4 depicts a simplified diagram of a fixed-block environment in accordance with one or more embodiments.

FIG. 4 depicts a fixed-block environment 400 that may be associated with a physical storage device or a virtual storage device. In the fixed-block layout, data is stored in blocks of a fixed size. In fixed-block environment 400, management system 102 receives a request for file 402. File 402 may be any file type that is suitable for storage within one or more physical or virtual storage devices. For example, file 402 may be an image file, a video file, audio file, database object, and the like. Once management system 102 receives the request for file 402, management system 102 may retrieve file metadata 404A. File metadata 404A may comprise, among other things, block pointers that point to one or more data blocks and/or one or more or block pointers.

File metadata 404A comprises block pointers 406A-406C. Block pointer 406A may point to data block 410A, block pointer 406B may point to data block 410B, block pointer 406C may point to block pointers 406D and 406E. In some systems, a grouping of block pointers may be limited. For example, in a ZFS system a data structure that represents an object (e.g., metadata) may only be able to include 3 block pointers. If these 3 block pointers cannot point to all the data blocks associated with a file then one or more of the block pointers must point to another set of block pointers. A block pointer that points to another block may be referred to as an indirect block pointer. In fixed-block environment 400, block pointer 406C is an indirect block pointer because it points to block pointer 406D and block pointer 406E within file metadata 404B. Block pointer 406D may point to data block 410C and block pointer 406E may point to data block 410D. In a fixed-block layout, each of data blocks 410A-410D may be the same size. For example, each data block may be 4 KB. In comparison with a variable-block environment, fixed-block environment 400 may require more metadata in the form of block pointers to locate data associated with a file. For example, in variable-block environment 300, data block 308B may be a 16 KB data block. In a variable-block environment, a 16 KB data block may only be associated with a single block pointer. In contrast, in fixed-block environment 400, data blocks 410A-410D may each be only 4 KB. As a result, 4 data blocks are needed to store 16 KB of data as opposed to 1 in the variable-block environment. Increased blocks may lead to increased block pointers, which leads to an increase in metadata. Furthermore, the more metadata associated with files in a storage device means less space to store files. For example, each block pointer may be 32 bits. In such an example, fixed-block environment 400 would require 96 more bits of storage to store 16 KB of data, as compared to a similar variable-block environment. Although a fixed-block environment may require more metadata it has the advantage of being easier to implement because the data block sizes may be pre-allocated instead of having to be allocated per data block as in a variable-block layout.

Figure 5:
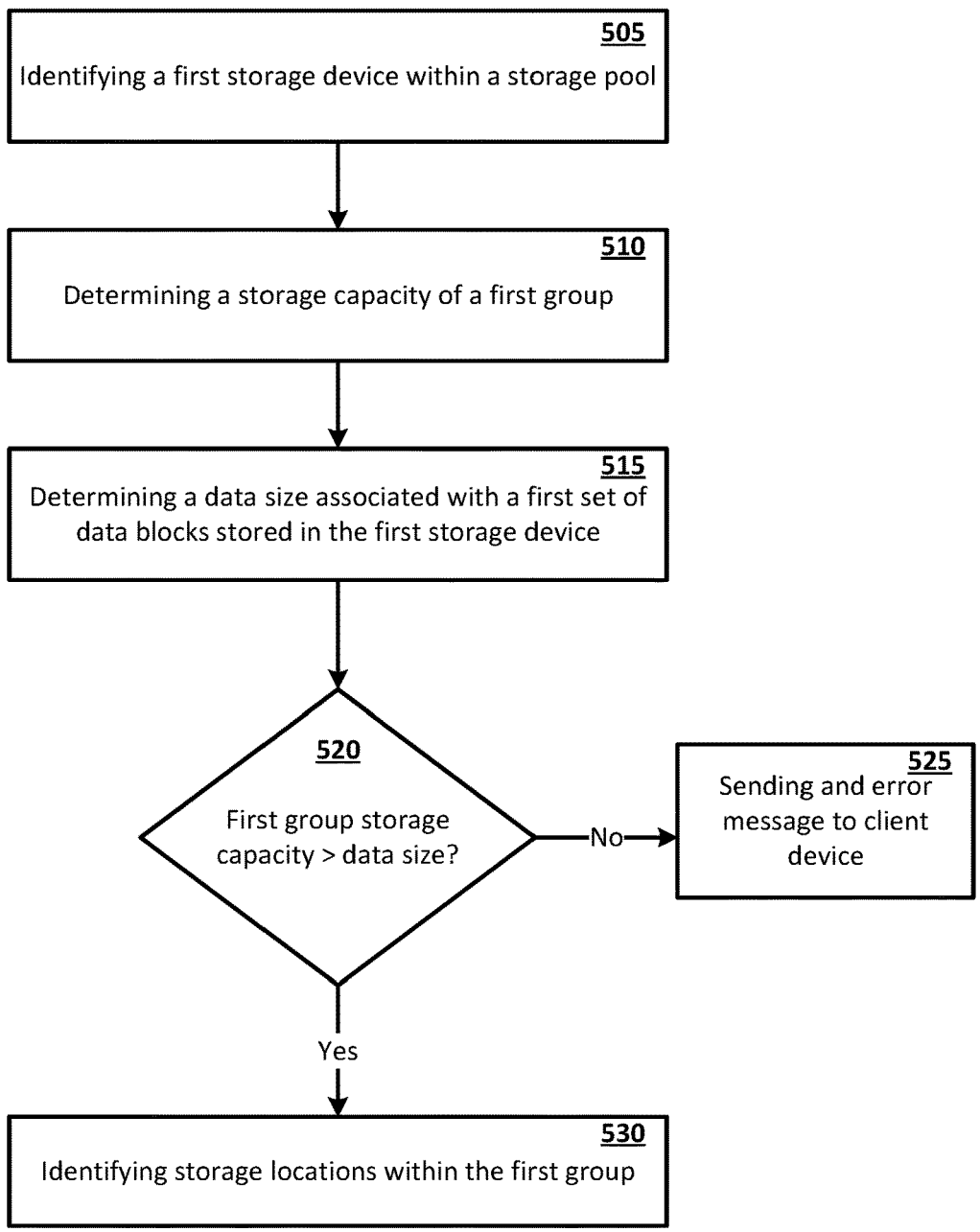
FIG. 5 illustrates an exemplary first process in accordance with one or more embodiments.

FIG. 5 depicts exemplary process 500 for determining if a virtual storage device may generated across one or more physical storage devices. The processing depicted in FIG. 5 may be implemented in software (e.g., code, instructions, program) executed by one or more processing units (e.g., processors, cores) of the respective systems, hardware, or combinations thereof. In certain embodiments, the processing depicted in FIG. 5 may be performed by one or more components of distributed environment (e.g., management system 102 of distributed environment 100).

At 505, a first storage device within a storage pool is identified. A storage pool may include a plurality of physical or virtual storage devices or set of portions of physical or virtual storage devices. There may be a plurality of storage pools within a storage system. In one embodiment, each storage pool may have a storage controller. A storage controller may manage one or more aspects of a storage pool. A storage controller may be controlled or implemented by a management system associated with the storage system. Each storage device within a storage pool may have the same type of configuration. For example, each storage device in a storage pool may implement variable-data blocks and RAID 3.

The first storage device may be a physical storage device within the storage pool that is flagged for removal from the storage pool. The first storage device may have been flagged in response to (for example) receiving a request from a client device to remove the first storage device from the storage pool, receiving a request from a client device to prepare the storage pool for removal of the first storage device from the storage pool, and/or detecting that a removal condition has been satisfied in association with the first storage device. For example, the removal condition may be configured to be satisfied in response to detecting that a query- or storage-processing speed of the first storage device is below a threshold, detecting that at least a threshold number or percentage of storage or retrieval requests do not receive a response within a predefined time period, detecting that at least a threshold number or percentage of responses to data-retrieval requests include erroneous data (e.g., not conforming to a size or format associated with the requested data), and so on. As a particular illustrative example, the removal condition can be configured to be satisfied upon detecting that the first storage device fails to respond to a query or challenge issued by a storage controller to the first storage device. As another particular illustrative example, the first storage device can be flagged for removal upon receiving a request for removal or reallocation of the first storage device from an authorized client device. The request may include a storage device identifier of the first storage device. A storage device identifier may be a unique arrangement of characters or numbers that uniquely identifies a storage device.

At 510, a storage capacity of a first group is determined. The first group may be a group of storage devices within the storage pool. In one embodiment, the first group may include all storage devices within the storage pool except the first storage device identified at 505. In one embodiment, to determine the storage capacity of the first group, a storage controller associated with the storage pool may query each storage device in the first group to determine the remaining storage capacities of each storage device. The remaining storage capacities may identify a quantity of available storage capacity for each storage device. The storage controller may then combine the remaining storage capacities of each storage device in the first group to determine the first group storage capacity.

At 515, a data size associated with a first set of data blocks stored in the first storage device is determined. Data within each storage device may be stored in data blocks. A storage controller associated with the first storage device may determine a data size of a first set of data blocks within the first storage device. The first set of data blocks may be all of the data blocks stored in the first storage device. The data size may indicate a quantity of data. For example, a data size may be expressed in GB, TB, and the like. The storage controller associated with the first storage device may query the first storage device to retrieve metadata associated with the first set of data blocks. The metadata associated with the first set of data blocks may indicate the location of each data block in the first set of data blocks and a data block size associated with each data block. The storage controller may then calculate the data size based upon the data block size for each data block in the first set of data blocks. In one embodiment, the data size may indicate the total size of the first set of data blocks and the associated metadata stored in the first storage device. In one embodiment, the data size may indicate the total size of the first set of data blocks stored in the first storage device and not the associated metadata.

At 520, it is determined whether the first group storage capacity is greater than the data size. The storage capacity of the first group determined at 510 may be compared to the data size determined at 515. This comparison may indicate whether the first group has the capacity to store the first set of data blocks. If it is determined that the storage capacity of the first group is not greater than the data size then at 525, an error message may be sent to a client device. The error message may be generated by a storage controller associated with the storage pool. The receiving client device may be associated with a system administer or another user associated with the storage system which contains the storage pool.

If it is determined that the storage capacity of the first group is greater than the data size then at 530, a plurality storage locations within the first group are identified. A storage location may be a physical area within a storage device where data can be stored. A storage location may be a sector and/or a track of a storage device. The storage locations may indicate an available sector or track within a storage device. An available sector or track within a storage device may be a track or sector that is available to receive data for storage. The storage locations may be indicated across all storage devices in the first group. In one embodiment, the storage locations may be indicated across only a subset of storage devices in the first group.

Figure 6:
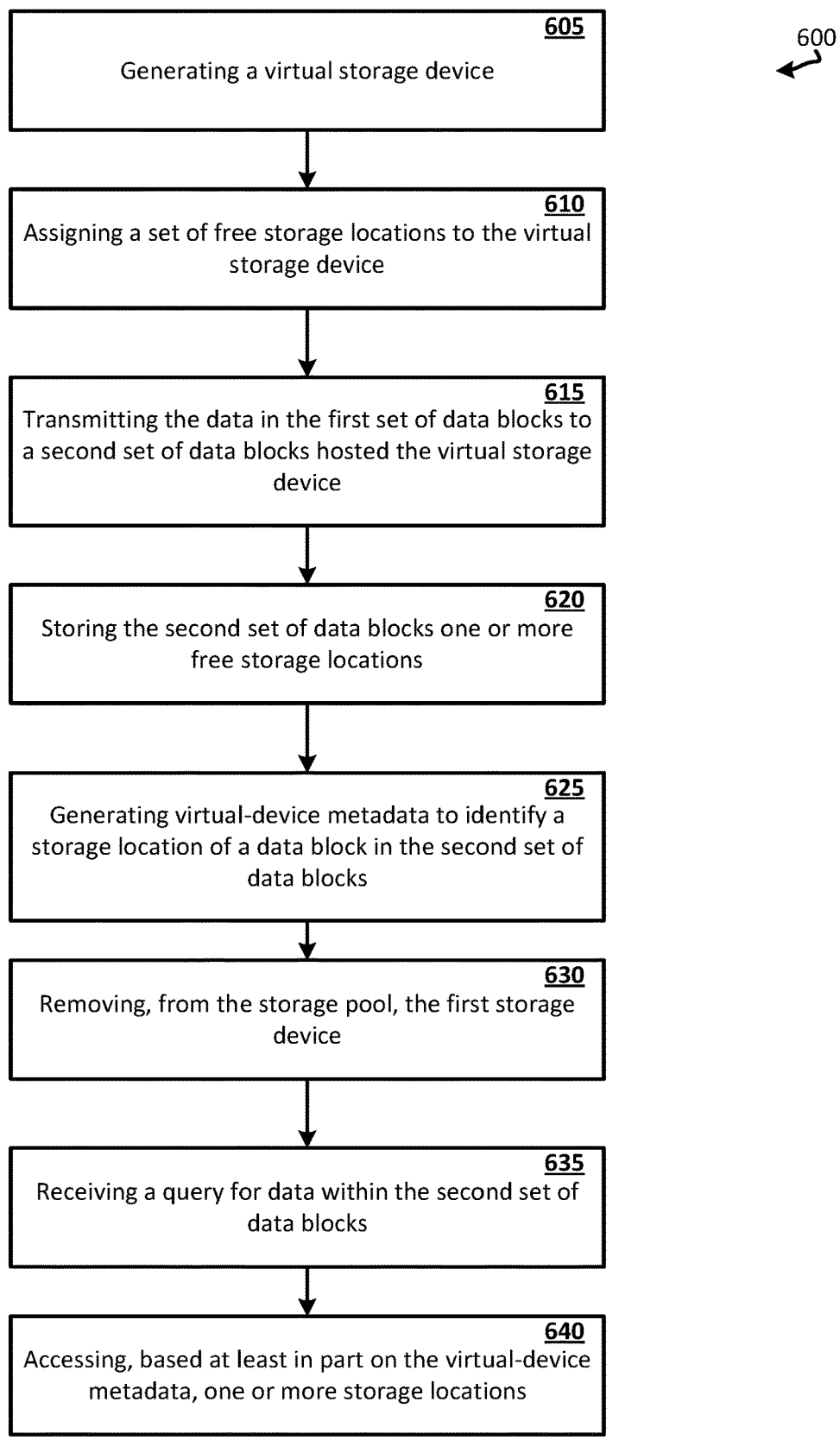
FIG. 6 illustrates an exemplary second process in accordance with one or more embodiments.

FIG. 6 depicts exemplary process 600 for generating a virtual storage device across a plurality of storage devices. The processing depicted in FIG. 6 may be implemented in software (e.g., code, instructions, program) executed by one or more processing units (e.g., processors, cores) of the respective systems, hardware, or combinations thereof. In certain embodiments, the processing depicted in FIG. 6 may be performed by one or more components of distributed environment (e.g., management system 102 of distributed environment 100).

At 605, a virtual storage device is generated. The virtual storage device may be generated by a storage controller associated with a storage pool. The virtual storage device may be a logical volume spans across multiple physical storage devices in the storage pool. To generate the virtual storage device, the storage controller may identify a first group of physical storage devices. The storage controller may determine a layout and/or configuration of a first storage device. The first storage device may be a storage device that can be replaced by the virtual storage device. The virtual storage device may implement the same layout and/or configuration as the first storage device. For example, the first storage device in the storage pool may implement variable-data blocks and RAID 5. In such an example, the storage controller may generate the virtual storage device to support variable-data blocks and RAID 5. By generating the virtual storage device based on the existing layout and/or configuration of the first storage device, the virtual storage device may maintain layout consistency. To an operating system (e.g. an operating system of a user device) interacting with the storage pool, the virtual storage device may appear as a single logical volume. Thus, to an operating system, a virtual storage device may appear to be the first storage device.

At 610, a set of free storage locations within the first group are assigned to the virtual storage device. Each of the set of free storage locations may correspond to an available sector or track within a storage device. The free storage locations may indicate potential locations to store one or more data blocks. A quantity of storage locations within the set of free storage locations may be determined based on a data size associated with the first storage device. For example, if the first storage device stores 10 GB of data then enough storage locations in the set of free storage locations are assigned to the virtual storage device to store 10 GB of data. In one embodiment, a computerized protocol may be implemented to evenly distribute the assigned storage locations across physical storage devices in the first group of physical storage devices. For example, if there are 4 physical storage devices in the first group of physical storage devices and each physical storage device has 3 then, in a circumstance where 4 storage locations are needed, a storage location from each physical storage device may be assigned to the virtual storage device. By assigning the storage locations to the virtual storage device, data stored, via the virtual storage device, may be stored in one or more physical storage devices in the first group.

At 615, data in the first set of data blocks (stored at the first device) is transferred to a second set of data blocks hosted by the virtual storage device. The second set of storage blocks may be configured in accordance with a configuration of the first set of data blocks. For example, if the first set of data blocks are fixed then the second set of data blocks may be fixed. In such an example, if the first set of data blocks are each 4 KB, then the second set of data blocks may each be 4 KB. In another example, if the first set of data blocks are variable then the second set of data blocks may be variable. In one embodiment, the first set of data blocks and the second set of data blocks have one-to-one mapping, such that a first block in the first set of data blocks is the same size and stores the same data (with the exception of metadata in some embodiments) as a first block in the second set of data blocks. In one embodiment, the first set of data blocks may be transmitted from the first storage device. In one embodiment, the first set of data blocks may be transmitted from another storage device that contains a copy or redundancy information associated with the first storage device. For example, if the first storage device is unavailable then a parity drive may contain redundancy information that may be used to restore the first set of data blocks that were stored in the first storage device. The data within first set of data blocks may be restored to the second set of data blocks. In one embodiment, metadata associated with the first set of data blocks may be transmitted to the virtual storage device. The metadata may include information associated with one or more files within the first set of data blocks. For example a single file may comprise of a plurality of data blocks. Metadata may contain various information about that file in order to recreate the file from the data blocks. In one embodiment, metadata may include, a file name, a file size, data block pointers, encryption information, and the like.

Metadata may be stored with the first storage device. In one embodiment, metadata associated with the first set of data blocks may not be transmitted to the virtual storage device. In such an embodiment, virtual-device metadata may be generated for data in the second set of data blocks by an associated storage controller.

At 620, the second set of data blocks are stored in one or more free storage locations assigned to the virtual device. The free storage locations may represent available places to store one or more data blocks across a plurality of physical storage devices in the first group. In one embodiment, a round-robin algorithm may be utilized by an associated storage controller to determine where to store each data block. The round-robin algorithm, via the storage controller, may first query a free storage location to determine a storage capacity of the free storage location. The round-robin algorithm may then compare the storage capacity of the free storage location to the data size of the one or more data blocks. If the storage capacity of the free storage location is sufficient to store the one or more data blocks, the one or more data blocks are stored in the storage location. If the storage capacity of the free storage location is not sufficient to store the one or more data blocks then another free storage location may be queried. In one embodiment, the round-robin algorithm may assign each free storage location a number and then run a pseudo random number generator that produces a number and, based upon the produced number, selects a free storage location with the corresponding number to determine if the free storage location is sufficient to store one or more data blocks. This round-robin process may be repeated for each data block in the second set of data blocks until every data block is stored.

At 625, virtual-device metadata is generated to identify a storage location of a block in the second set of data blocks. virtual-device metadata may be generated by a storage controller associated with the storage pool to identify storage locations associated with each data block in the second set of data blocks. The virtual storage device spans across a plurality of physical storage devices, and virtual-device metadata may be generated to identify the storage location where each data block is stored. Virtual-device metadata may identify relationships between data blocks. For example, virtual-device metadata may indicate that a particular set of data blocks are part of a single file. Virtual-device metadata may also indicate, via a block pointer, a physical storage location of each block. The virtual-device metadata may be stored in the virtual storage device. Using the virtual-device metadata, the storage controller or another device may be able to find data blocks in physical storage. For example, virtual-device metadata may indicate a file name of "John's image" is a 1.5 MB file. In such an example, there may be block pointers within the virtual-device metadata. A first block pointer may point to a first storage location in a first physical storage device and a second block pointer may point to a second location in a second physical storage device. The first block pointer may point to a 1 MB data block and the second block pointer may point to a 500 KB data block.

At 630, the first storage device is removed from the storage pool. In one embodiment, the first storage device may be physically removed from storage pool and disconnected from each other storage device in the pool. In such an embodiment, a person or machine may physically remove the first storage device from the storage pool. In one embodiment, the first storage device may be virtually removed from the storage pool. In such an embodiment, an associated storage controller may modify a list of storage device identifiers associated with the storage pool to remove an identifier associated with the first storage device from the list of storage device identifiers. In one embodiment, when the first storage device is removed (either virtually or physically) it may be placed into a different storage pool.

At 635, a query is received for data within the second set of data blocks. The query may be received from a user device connected to the storage system via an Internet connection. The query may be received by a storage controller associated with the storage pool. The query may include a file identifier. In one embodiment, a storage controller associated with the storage pool, utilizing the file identifier, may retrieve virtual-device metadata associated with the file identifier. The virtual-device metadata may contain one or more block pointers that point to the location of each data block associated with the file identifier.

At 640, one or more storage locations (corresponding to those identified in the virtual-device metadata's block pointers) are accessed based on virtual-device metadata. The storage controller may then access one of more storage locations to retrieve the data blocks stored in that storage location and return those data blocks to the requesting client device. The data blocks may then be aggregated (e.g., to form a single file) and transmitted to the user device.

Figure 7:
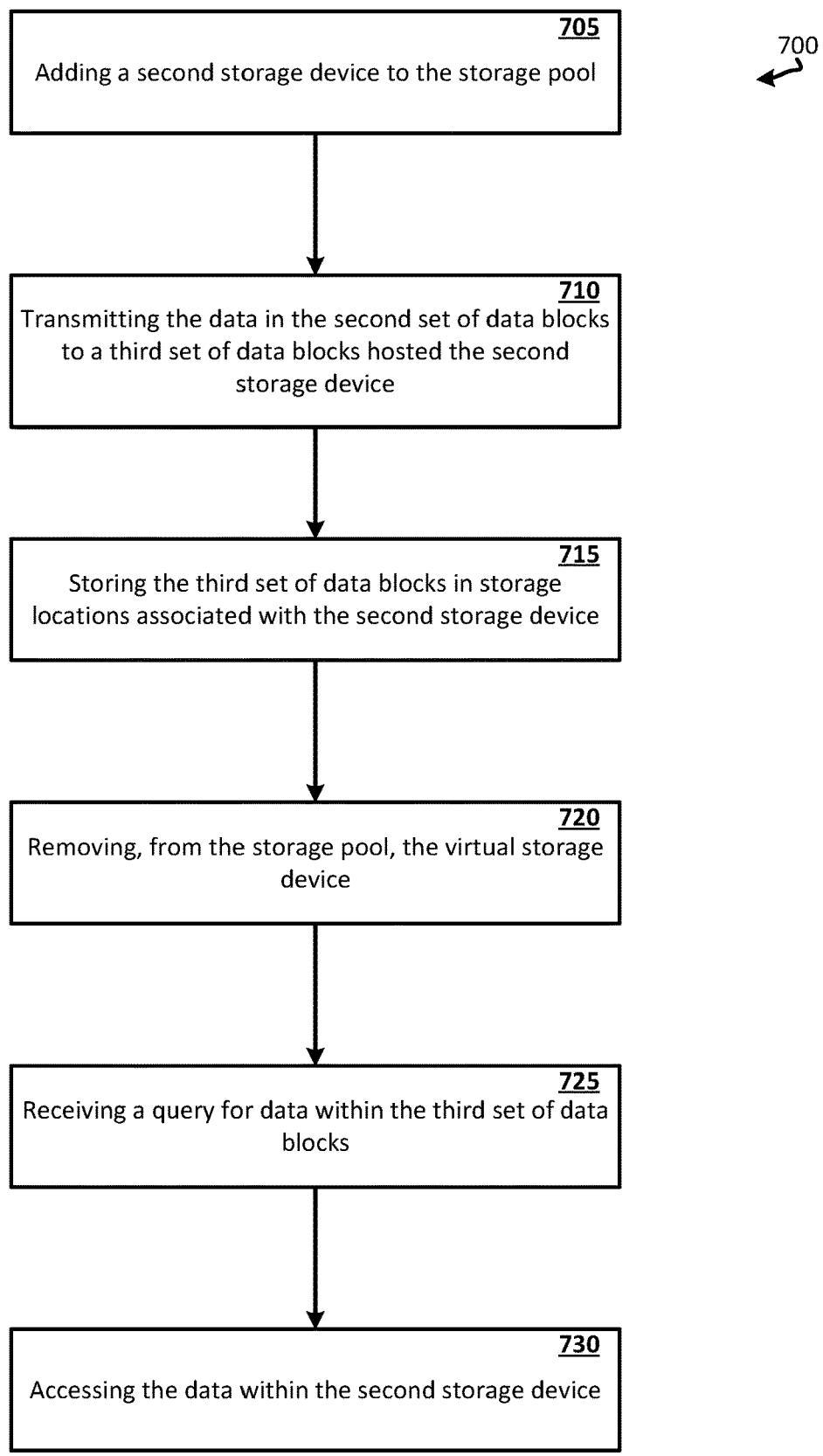
FIG. 7 illustrates an exemplary third process in accordance with one or more embodiments.

FIG. 7 depicts exemplary process 700 for replacing a virtual storage device with a physical storage device. The processing depicted in FIG. 7 may be implemented in software (e.g., code, instructions, program) executed by one or more processing units (e.g., processors, cores) of the respective systems, hardware, or combinations thereof. In certain embodiments, the processing depicted in FIG. 7 may be performed by one or more components of distributed environment (e.g., management system 102 of distributed environment 100).

At 705, a second storage device is added to the storage pool. The second storage device may be physical storage device. The second storage device may be physically added to the storage pool (e.g., by electrically connecting to a hard drive array) by a person or a machine. In one embodiment, the second storage device, may be virtually added to the storage pool. In such an embodiment, an associated storage controller may detect the second storage device by sending a challenge or a pulse to a port that connects the second storage device. If a response is received from the pulse or challenge, it may indicate, to the associated storage controller, a device (e.g. the second storage device) is connected. After the detection, the associated storage controller may modify a list of storage device identifiers associated with the storage pool to include an identifier associated with the second storage device. In one embodiment, the second storage device may be a brand new storage device from a physical device manufacturer or may be a previously used storage device that has been reallocated from another storage pool.

At 710, data in the second set of data blocks is transferred to a third set of data blocks for storage within the second storage device. The data in the second set of data blocks can be transferred to the third set of data blocks for storage within the second storage device. The transfer of data may be triggered by various events. For example, the transfer of data may be initiated based on a request from a client device to add the second storage device to the storage pool. In another example, the transfer of data may be initiated based on a storage controller detecting the second storage device. The third set of data blocks may take the configuration of the second set of data blocks. In one embodiment, the second set of data blocks and the third set of data blocks have one-toone mapping, such that a first block in the second set of data blocks is the same size and stores the same data (with the exception of metadata in some embodiments) as a first block in the third set of data blocks. In one embodiment, the third set of storage blocks may have a different configuration. For example, if the second set of data blocks are variable-block sizes, the third set of data blocks may be fixed-block sizes. Such an instance may occur when the second storage device is preformatted in a fixed-block layout. In such an example, a block allocator may receive data within the second set of data blocks and allocate and segment, as needed, the data into a third set of fixed-data blocks. These set of fixed-size data blocks along with pointers to the data blocks may be stored in the second storage device. In one embodiment, virtual-device metadata associated with the second set of data blocks may be transmitted to the second storage device. The virtual-device metadata may be transferred to the second storage device, so that the second storage device (or an associated storage controller) may identify relationships between data blocks (e.g., which data blocks are associated with which files.) In one embodiment, virtual-device metadata associated with the second set of data blocks may not be transmitted to the second storage device. In such an embodiment, metadata may be generated for data in the third set of data blocks by an associated storage controller or block allocation. For example, received virtual-device metadata may indicate a first file comprises data block 1, data block 2, and data block 3. The associated storage controller may retain this metadata and add to the metadata block pointers associated with data block 1, data block 2, and data block 3. These block pointers will point to physical storage locations within the second storage device. Thus, a storage controller is able to generate new metadata for the second storage device based upon the virtual-device metadata.

At 715, the third set of data blocks are stored in one or more storage locations. The storage locations may represent available places to store one or more data blocks in the second storage device. Any suitable algorithm, such as, an round-robin algorithm, a continuous storage algorithm, buddy memory algorithm, and the like may be used to determine which storage location may be used to store one or more data blocks of the third set of data blocks.

At 720, the virtual storage device is removed from the storage pool. In one embodiment, an associated storage controller may modify a list of storage device identifiers associated with the storage pool to remove an identifier associated with the virtual storage from the list of storage device identifiers. In one embodiment, when the virtual storage device is removed, it may be deleted so as to release storage locations across the first set of devices at which various data blocks associated with the virtual device had been stored. Thus, when the virtual storage device is deleted, one or more storage locations assigned to the virtual storage device (at 610) may then be reassigned to their respective physical storage devices. For example, if a first assigned storage location is physically located in a third storage device and a second assigned storage location is physically located in a fourth storage device, then upon deleting the virtual storage device, the first assigned storage location is reassigned to the third storage device and the second assigned storage location is reassigned to the fourth storage device. This reassignment process may put one or more storage devices in the configuration in which the one or more storages devices were in prior to the generation of the virtual storage device.

At 725, a query is received for data within the third set of data blocks. The query may be received from a user device connected to the storage system via an Internet connection. The query may be received by a storage controller associated with the storage pool. The query may include a file identifier. In one embodiment, a storage controller associated with the storage pool, utilizing the file identifier, may retrieve metadata associated with the file identifier. The metadata may contain one or more block pointers that point to the location of each data block associated with the file identifier.

At 730, one or more storage locations (corresponding to those identified in the metadata's block pointers) are accessed based on metadata. The storage controller may then access one of more storage locations to retrieve the data blocks stored in that storage location and return those data blocks to the requesting client device. The data blocks may then be aggregated (e.g., to form a single file) and transmitted to the user device.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A system comprising:
   one or more processors;
   a memory coupled to the one or more processors, the memory storing a plurality of instructions executable by the one or more processors, the plurality of instructions comprising instructions that when executed by the one or more processors cause the one or more processors to perform processing comprising:
   identifying a plurality of storage devices in a storage system, the plurality of storage devices being physical storage devices;
   identifying a first storage device from the plurality of storage devices, the first storage device comprising a first set of data blocks, the first storage device implementing variable data-block sizes;
   identifying a first group of storage devices from the plurality of storage devices;
   identifying a group storage capacity associated with the first group of storage devices, the group storage capacity identifies a quantity of available data storage space within the first group of storage devices;
   querying the first storage device to determine a first data size associated with data stored in the first set of data blocks;
   comparing the first data size to the group storage capacity to determine that the group storage capacity exceeds the first data size;
   in response to determining the group storage capacity exceeds the first data size, identifying one or more storage locations in the first group of storage devices, a storage location being a physical location within a physical storage device that stores data;
   processing an indication of a triggering event corresponding to a condition of the first storage device, and, responsive to the triggering event, generating a virtual storage device, the virtual storage device being associated with the one or more storage locations, the virtual storage device implementing variable data-block sizes;
   transmitting the data stored in the first set of data blocks to a second set of data blocks hosted by the virtual storage device;
   storing data within the second set of data blocks in one or more storage locations;
   generating virtual-device metadata associated with the second set of data blocks, the virtual-device metadata identifying one or more storage locations holding one or more data blocks in the second set of data blocks;
   receiving a query for a first data set, the first data set being within the second set of data blocks; and
   in response to the query for the first data set, accessing, based at least in part on the virtual-device metadata, one or more blocks in the second set of data blocks.

2. The system of claim 1, wherein the instructions that when executed by the one or more processors cause the one or more processors to perform processing comprising:
   in response to storing the data within the second set of data blocks in one or more storage locations, removing, from the plurality of storage devices, the first storage device.

3. The system of claim 1, wherein the instructions that when executed by the one or more processors cause the one or more processors to perform processing comprising:
   adding, a second storage device to the plurality of storage devices, the second storage device being a physical storage device and the second storage device implementing fixed-data block sizes;
   transmitting second data stored in the second set of data blocks to a third set of data blocks hosted by the second storage device;
   receiving a query for a second data set within the third set of data blocks; and
   in response to the query for the second data set, accessing, one or more blocks of the third set of data blocks.

4. The system of claim 3, wherein the instructions that when executed by the one or more processors cause the one or more processors to perform processing comprising:
   in response to transmitting the second data stored in the second set of data blocks to the third set of data blocks hosted by the second storage device, deleting the virtual storage device.

5. The system of claim 1, wherein the storage system is a ZFS 2 storage system.

6. A computer-implemented method comprising:
   identifying a plurality of storage devices in a storage system, the plurality of storage devices being physical storage devices;
   identifying a first storage device from the plurality of storage devices, the first storage device comprising a first set of data blocks, the first storage device implementing variable data-block sizes;
   identifying a first group of storage devices from the plurality of storage devices;
   identifying a group storage capacity associated with the first group of storage devices, the group storage capacity identifies a quantity of available data storage space within the first group of storage devices;
   querying the first storage device to determine a first data size associated with data stored in the first set of data blocks;
   comparing the first data size to the group storage capacity to determine that the group storage capacity exceeds the first data size;
   in response to determining the group storage capacity exceeds the first data size, identifying one or more storage locations in the first group of storage devices, a storage location being a physical location within a physical storage device that is free to store one or more data blocks;
   processing an indication of a triggering event corresponding to a condition of the first storage device, and, responsive to the triggering event, generating a virtual storage device, the virtual storage device being associated with the one or more storage locations, the virtual storage device implementing variable data-block sizes;
   transmitting the data stored in the first set of data blocks to a second set of data blocks hosted by the virtual storage device;

storing data within the second set of data blocks in one or more storage locations;

generating virtual-device metadata associated with the second set of data blocks, the virtual-device metadata identifying one or more storage locations holding one or more data blocks in the second set of data blocks;

receiving a query for a first data set, the first data set being within the second set of data blocks; and in response to the query for the first data set, accessing, based at least in part on the virtual-device metadata, one or more blocks in the second set of data blocks.

7. The computer-implemented method of claim 6, further comprising:

in response to storing the data within the second set of data blocks in one or more storage locations, removing, from the plurality of storage devices, the first storage device.

8. The computer-implemented method of claim 6, further comprising:

adding, a second storage device to the plurality of storage devices, the second storage device being a physical storage device and the second storage device implementing fixed-data block sizes;

transmitting second data stored in the second set of data blocks to a third set of data blocks hosted by the second storage device;

receiving a query for a second data set within the third set of data blocks; and in response to the query for the second data set, accessing, one or more blocks of the third set of data blocks.

9. The computer-implemented method of claim 8, further comprising:

in response to transmitting the second data stored in the second set of data blocks to the third set of data blocks hosted by the second storage device, deleting the virtual storage device.

10. The computer-implemented method of claim 6, wherein the storage system is a ZFS storage system.

11. The computer-implemented method of claim 1, wherein the associating the virtual storage device with the one or more storage locations comprises determining, based at least in part on a round-robin selection process, the one or more storage locations.

12. The computer-implemented method of claim 6, wherein the plurality of storage devices belong to a same ZFS pool.

13. A non-transitory computer-readable memory storing a plurality of instructions executable by one or more processors, the plurality of instructions comprising instructions that when executed by the one or more processors cause the one or more processors to perform processing comprising:

identifying a plurality of storage devices in a storage system, the plurality of storage devices being physical storage devices;

identifying a first storage device from the plurality of storage devices, the first storage device comprising a first set of data blocks, the first storage device implementing variable data-block sizes;

identifying a first group of storage devices from the plurality of storage devices;

identifying a group storage capacity associated with the first group of storage devices, the group storage capacity identifies a quantity of available data storage space within the first group of storage devices;

querying the first storage device to determine a first data size associated with data stored in the first set of data blocks;

comparing the first data size to the group storage capacity to determine that the group storage capacity exceeds the first data size;

in response to determining the group storage capacity exceeds the first data size, identifying one or more storage locations in the first group of storage devices, a storage location being a physical location within a physical storage device that stores data;

processing an indication of a triggering event corresponding to a condition of the first storage device, and, responsive to the triggering event, generating a virtual storage device, the virtual storage device being associated with the one or more storage locations, the virtual storage device implementing variable data-block sizes;

transmitting the data stored in the first set of data blocks to a second set of data blocks hosted by the virtual storage device;

storing data within the second set of data blocks in one or more storage locations;

generating virtual-device metadata associated with the second set of data blocks, the virtual-device metadata identifying one or more storage locations holding one or more data blocks in the second set of data blocks;

receiving a query for a first data set, the first data set being within the second set of data blocks; and in response to the query for the first data set, accessing, based at least in part on the virtual-device metadata, one or more blocks in the second set of data blocks.

14. The non-transitory, computer-readable memory of claim 13, wherein the instructions that when executed by the one or more processors further cause the one or more processors to perform processing comprising:

in response to storing the data within the second set of data blocks in one or more storage locations, removing, from the plurality of storage devices, the first storage device.

15. The non-transitory, computer-readable memory of claim 13, wherein the instructions that when executed by the one or more processors further cause the one or more processors to perform processing comprising:

adding, a second storage device to the plurality of storage devices, the second storage device being a physical storage device and the second storage device implementing fixed-data block sizes;

transmitting second data stored in the second set of data blocks to a third set of data blocks hosted by the second storage device;

receiving a query for a second data set within the third set of data blocks; and in response to the query for the second data set, accessing, one or more blocks of the third set of data blocks.

16. The non-transitory, computer-readable memory of claim 15, wherein the instructions that when executed by the one or more processors further cause the one or more processors to perform processing comprising:

in response to transmitting the second data stored in the second set of data blocks to the third set of data blocks hosted by the second storage device, deleting the virtual storage device.

17. The non-transitory, computer-readable memory of claim 13, wherein the storage system is a ZFS storage system.

18. The non-transitory, computer-readable memory of claim 13 wherein the associating the virtual storage device with the one or more storage locations comprises determining, based at least in part on a round-robin selection process, the one or more storage locations.

19. The system of claim 1, wherein the associating the virtual storage device with the one or more storage locations comprises determining, based at least in part on a round-robin selection process, the one or more storage locations.

20. The non-transitory, computer-readable memory of claim 13, wherein the plurality of storage devices belong to a same ZFS pool.

* * * * *

UNITED STATES PATENT AND TRADEMARK OFFICE
CERTIFICATE OF CORRECTION

PATENT NO. : 10,754,569 B2  
APPLICATION NO. : 16/123832  
DATED : August 25, 2020  
INVENTOR(S) : Jeyaram et al.

Page 1 of 1

It is certified that error appears in the above-identified patent and that said Letters Patent is hereby corrected as shown below:

In the Specification

In Column 13, Line 35, delete "virtual-device" and insert -- Virtual-device --, therefor.

In the Claims

In Column 18, Line 31, in Claim 5, delete "ZFS 2" and insert -- ZFS --, therefor.

In Column 19, Line 47, in Claim 13, delete "non-transitory" and insert -- non-transitory, --, therefor.

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*